United States Patent [19]

Maucher

[11] Patent Number: 4,625,847

[45] Date of Patent: Dec. 2, 1986

[54] DIAPHRAGM SPRING FOR USE IN FRICTION CLUTCHES OR THE LIKE

[75] Inventor: Paul Maucher, Sasbach, Fed. Rep. of Germany

[73] Assignee: Luk Lamellen und Kupplungsbau GmbH, Bühl, Fed. Rep. of Germany

[21] Appl. No.: 656,434

[22] Filed: Nov. 7, 1984

Related U.S. Application Data

[63] Continuation of Ser. No. 337,516, Jan. 6, 1982, Pat. No. 4,492,293.

[51] Int. Cl.$^4$ .......................... F16D 13/44; F16F 1/34
[52] U.S. Cl. ................................ 192/89 B; 267/158; 267/161
[58] Field of Search ........................... 192/70.27, 89 B; 267/158, 164, 181, 161

[56] References Cited

U.S. PATENT DOCUMENTS

| 3,977,504 | 8/1976 | Kajitani | 192/89 B |
| 4,241,819 | 12/1980 | Babcock et al. | 192/89 B |

FOREIGN PATENT DOCUMENTS

| 0023790 | 2/1981 | European Pat. Off. | |
| 1928288 | 9/1965 | Fed. Rep. of Germany. | |
| 7621265 | 1/1977 | Fed. Rep. of Germany. | |
| 2402813 | 4/1979 | France. | |
| 1347485 | 2/1974 | United Kingdom | 192/89 B |
| 2055995 | 3/1981 | United Kingdom | 192/89 B |

Primary Examiner—Rodney H. Bonck
Attorney, Agent, or Firm—Peter K. Kontler

[57] ABSTRACT

A diaphragm spring which can be used in a friction clutch for automotive vehicles has a circumferentially complete annular section and elongated fingers extending radially inwardly from the annular section and having inner end portions of substantially uniform width, as considered in the circumferential direction of the annular section. The slots between neighboring fingers include alternating narrower and wider slots, and the slots have enlarged outermost portions in the region of the annular section. The width of the outermost portion of each wider slot equals twice the width of the outermost portion of a narrower slot plus the width of the outermost portion of a finger. The width of the innermost portions of the slots is uniform, and the spring is secured to the cover of a clutch by rivets whose shanks extend through the outermost portions of the narrower slots. The end faces of the inner end portions of the fingers bound a substantially circular opening.

12 Claims, 2 Drawing Figures

DIAPHRAGM SPRING FOR USE IN FRICTION CLUTCHES OR THE LIKE

This application is a continuation of application Ser. No. 337,516, filed Jan. 6, 1982 and now U.S. Pat. No. 4,492,293.

BACKGROUND OF THE INVENTION

The present invention relates to so-called diaphragm springs, also known as Belleville springs, which can be utilized in many types of friction clutches for automotive vehicles or the like.

A diaphragm spring of the type under consideration here comprises an annular outer section and an annulus of radially inwardly extending fingers or prongs whose inner end portions can be engaged to cause the spring to pivot about one or more seats in the general area where the fingers extend inwardly from the annular section and to thus change its shape (conicity). As a rule, the neighboring fingers of the annulus are separated from each other by elongated radially extending slots having enlarged outermost portions in the region of the annular section. A diaphragm spring can be mounted in such a way that it is flat or nearly flat in idle condition but its conicity invariably changes when in use, e.g., in order to engage or disengage a friction clutch by establishing or terminating a torque-transmitting connection between a rotary driving member and a rotary driven member. Typical examples of driving members are the flywheels of internal combustion engines, and typical examples of driven members are flanges on the input shafts of change-speed transmissions in automotive vehicles.

It is known that the annular section of a diaphragm spring of the above outlined character is not free to undergo optimum deformation in response to displacement of the tips of fingers in the axial direction of the spring. This is due to the fact that the rigidity of the transition zone between the annular section and the fingers (at least as considered in the circumferential direction of the annular section) is quite pronounced. The increased localized rigidity causes the formation of undulations, as considered in the circumferential direction of the annular section, when the diaphragm spring is installed in prestressed condition. The pronouncedness of such undulations depends on the ratio of width of the annular section to the width of the fingers in the transition zone. The undulations are more pronounced if the aforementioned ratio is reduced, i.e., if the width of the fingers with reference to the width of the annular section is increased. Furthermore, undulations of the annular section entail the development of additional tensional stresses whose magnitude increases with increasing width of the fingers and which can become critical in the region between the enlarged outermost portions of the slots between the fingers. In many instances, the stresses which arise as a result of unsatisfactory ratio of the width of the fingers to the width of the annular section lead to premature breakage of the annular section with attendant damage to or complete destruction of the device or aggregate in which the diaphragm spring is used. The consequences of such breakage can be readily appreciated if one considers that diaphragm springs are important components of a large number of friction clutches for automotive vehicles.

In view of the above, one would be led to the assumption that the drawbacks of conventional diaphragm springs can be overcome by the simple expedient of increasing the number of fingers with attendant reduction of their width in the region of the annular section and with attendant reduction of the ratio of width of the fingers to width of the annular section. An alternative or additional solution would involve increasing the width of the enlarged outermost portions of slots between neighboring fingers. However, for reasons of manufacture as well as for reasons of ensuring that the useful life of a diaphragm spring will not be reduced below a certain minimum acceptable period of time, the just discussed modifications of conventional springs can be carried out only within a relatively narrow range. As disclosed in German Utility Model No. 1,928,288, the width of an enlarged outermost portions of slots between the fingers of a diaphragm spring which is used in a friction clutch cannot be increased at will because this would necessitate the utilization of larger-diameter rivets which secure the spring to a support, such as the cover of a friction clutch. The diameters of the shanks of the just mentioned rivets must be increased if the width of the outermost portions of the slots is increased because, in addition to their connecting or securing action, the rivets also perform the function of centering the spring with reference to its support. The use of larger and heavier rivets contributes to the cost of the clutch as well as to the bulk (as considered radially and axially of the clutch) and weight of the spring and of the device in which the spring is put to use.

As concerns the number of fingers, i.e., increasing the number of fingers with attendant reduction of their width in the region of annular section of the spring, an undue increase in the number of fingers is not warranted and advisable in many instances for several reasons, such as the facility of making the spring and especially the desired useful life of the spring. For example, when a diaphragm spring is used in a friction clutch, the area of contact which is established by the inner end portions of the fingers (namely, by those portions which are to be acted upon by the clutch engaging and disengaging means, such as an annular pusher or a ball bearing) cannot be reduced below a certain value without unduly increasing the wear upon the tips of the fingers. As regards the slots between neighboring fingers, their width cannot be reduced below a certain value for manufacturing reasons. In other words, by increasing the number of fingers well beyond the number of fingers in presently known diaphragm springs, one would unduly reduce the ratio of combined area which is taken up by the slots to the combined or total area which is taken up by the fingers with attendant reduction of the aforementioned area of contact between the inner end portions of the fingers and the parts which effect the engagement or disengagement of the clutch wherein the spring is used. As mentioned above, the area of contact cannot be reduced at will because this entails a pronounced increase of wear upon the tips of the fingers.

Commonly owned French patent application Ser. No. 78-25606 discloses a pulley for a V-belt. The pulley employs a diaphragm spring with wider and narrower slots between neighboring fingers and with links which extend substantially tangentially of the hub of the pulley and are secured to fasteners which extend through the enlarged outermost portions of wider slots. The relatively wide slots contribute significantly to a reduction of the combined area of the inner end portions or tips of the fingers.

European patent application Ser. No. 0 23 790 discloses a diaphragm spring which is used in a friction clutch and wherein the flexibility of fingers forming part of the spring is increased by removing certain fingers. Here, too, the combined area of the inner end portions or tips of the fingers is unduly reduced as a result of elimination or removal of certain fingers.

German Utility Model No. 76 21 265 discloses a friction clutch which employs a diaphragm spring with radially inwardly extending fingers each flanked by a relatively wide and a relatively narrow slot (note FIG. 4). The wide slots contribute to a significant reduction of the combined area of the inner end portions or tips of the fingers so that the wear upon such finger tips is highly pronounced when the clutch is in use.

OBJECTS AND SUMMARY OF THE INVENTION

An object of the invention is to provide a novel and improved diaphragm spring for use in friction clutches or other devices which is constructed and assembled in such a way that the extent to which the spring undulates in the region where the fingers extend from the annular section of the spring is held to a minimum.

Another object of the invention is to provide a diaphragm spring wherein the stresses which arise as a result of undulation of the spring, in the region where the outer end portions of the fingers merge into the annular section, when the conicity of the spring is changed is negligible or nil.

A further object of the invention is to provide a diaphragm spring wherein the above outlined advantages can be achieved without unduly reducing the contact area in the region of the inner end portions of the fingers, i.e., without unduly increasing the wear upon the inner end portions of the fingers when the spring is used in a friction clutch or a like device wherein the conicity of the spring is changed by applying a force to the inner end portions of the fingers.

An additional object of the invention is to provide a diaphragm spring whose useful life is incomparably longer than that of heretofore known diaphragm springs, especially of those conventional diaphragm springs wherein the extent of undulation in the region of merger of outer end portions of the fingers into the annular section is as small as in the improved spring.

Still another object of the invention is to provide a diaphragm spring which can be produced in a relatively simple machine, whose cost does not exceed the cost of conventional springs, and whose dimensions need not be unduly increased for the express purpose of reducing the extent of undulation in the region where the outer end portions of the fingers merge into the annular section of the spring.

Another object of the invention is to provide a diaphragm spring wherein the slots between the fingers are configurated, dimensioned and distributed in a novel and improved way.

An ancillary object of the invention is to provide a novel and improved distribution and dimensioning of the inner end portions or tips of fingers in a diaphragm spring of the above outlined character.

A further object of the invention is to provide a device, especially a friction clutch, which embodies the improved diaphragm spring and to construct and assemble the device in such a way that the spring can be secured thereto by simple, inexpensive and compact fasteners.

One feature of the invention resides in the provision of a diaphragm spring, particularly a Belleville spring for use in a friction clutch or the like, which comprises an annular main section and a plurality of elongated fingers extending from the annular section substantially radially inwardly and having inner end portions with end faces defining a substantially circular opening at the center of the spring. The widths of the inner end portions of all fingers (as considered in the circumferential direction of the annular section) are at least substantially identical, and the fingers define between themselves alternating elongated narrower first and wider second slots extending from the central opening to the annular section and respectively having enlarged first and second outermost portions of greater and lesser width, again as considered in the circumferential direction of the annular section.

The width of each second outermost slot portion (i.e., of the outermost portion of each slot of greater width) preferably equals or approximates $2m+n$ wherein $m$ is the width of the outermost portion of a narrower slot and $n$ is the width of a finger in the region of the annular section of the diaphragm spring.

Pairs of neighboring fingers of the diaphragm spring are separated from each other by first slots and are followed by second slots, as considered in the circumferential direction of the annular section. In other words, a first finger is followed by a narrower slot, by a second finger, by a wider slot, by a first finger, by a narrower slot, by a second finger, by a wider slot, and so forth all the way around the central opening. The innermost portions of all slots are preferably of constant width, and each wider or second slot further includes an elongated intermediate section which extends from the respective innermost to the respective outermost portion and tapers outwardly at a relatively small acute angle toward the respective outermost portion. The width of intermediate portions of narrower slots may but need not be constant all the way from the innermost portion of constant width to the respective outermost portion. The annular section is preferably provided with relatively short lugs which extend substantially radially inwardly into each second outermost slot portion. Such lugs can constitute the remnants or outer end portions of removed fingers, namely, of each third finger, as considered in the circumferential direction of the annular section of the spring.

If the improved diaphragm spring is installed in a friction clutch or an analogous device, it is preferably connected with a support (such as a cover or housing) by securing means including discrete fasteners in the form of rivets or the like, and each fastener preferably includes a portion (such as the shank of a rivet) which extends through the outermost portion of a narrower or first slot.

The novel features which are considered as characteristic of the invention are set forth in particular in the appended claims. The improved diaphragm spring itself, however, both as to its construction and the mode of installing the same, together with additional features and avantages thereof, will be best understood upon perusal of the following detailed description of certain specific embodiments with reference to the accompanying drawings.

DESCRIPTION OF THE PREFERRED EMBODIMENTS

Figure 1:
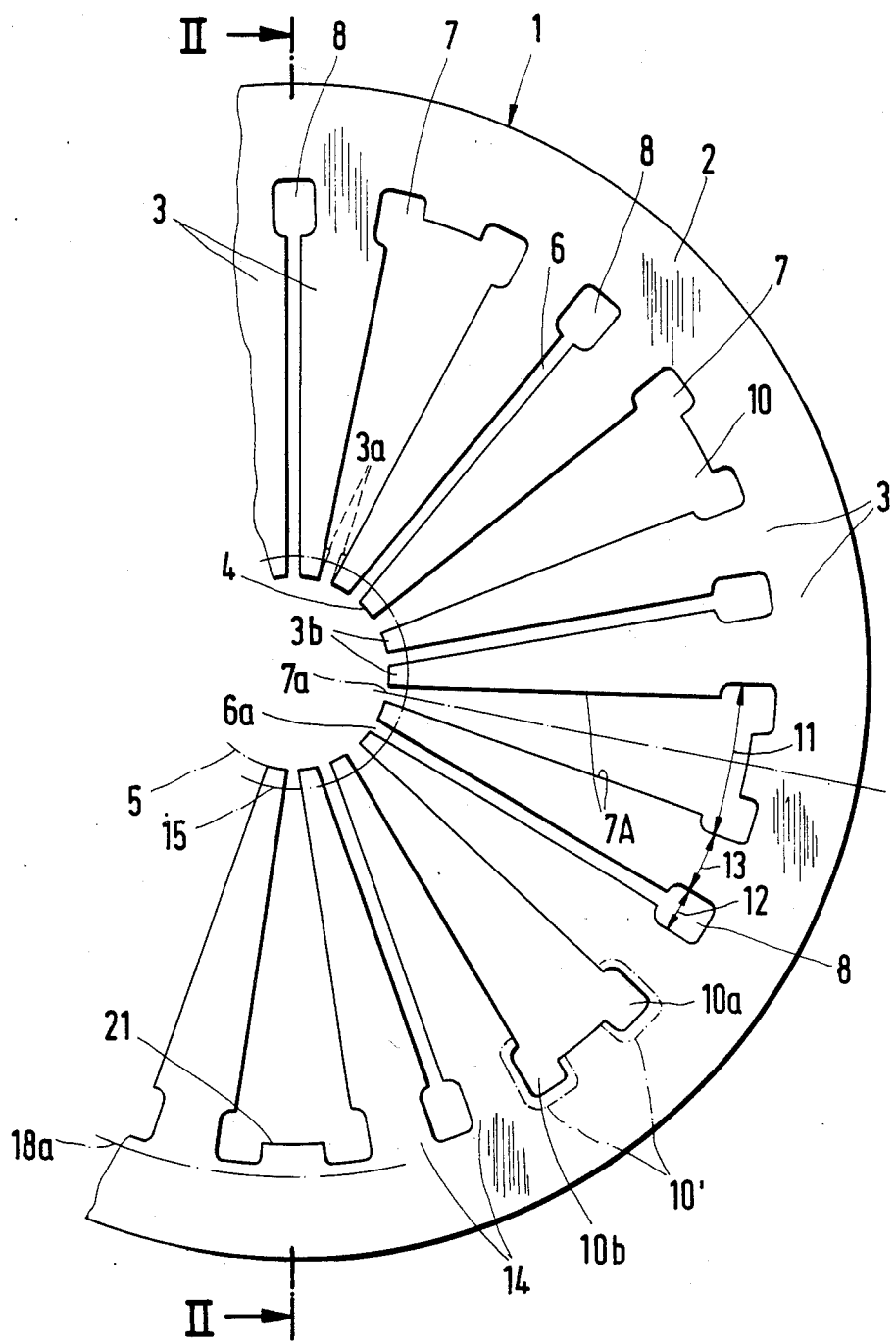
FIG. 1 is a fragmentary side elevational view of a diaphragm spring which embodies the present invention.

FIG. 1 shows a diaphragm spring 1, and more specifically a Belleville spring of the type suitable for use in friction clutches for automotive vehicles. The spring 1 comprises a circumferentially complete annular main section 2 and a plurality of elongated tongues or fingers 3 which extend radially inwardly of the annular section 2 and have inner end portions 3b with end faces 4 which define and surround an at least substantially circular opening 5 disposed centrally of the annular section 2. A portion of this opening is indicated by a phantom-line arc. The neighboring tongues or fingers 3 (hereinafter called fingers) are separated from each other by alternating relatively narrow elongated slots 6 and relatively wide elongated slots 7. The width of the innermost (6a) and intermediate portions of the narrower slots 6 is constant or nearly constant all the way to the respective enlarged outermost portions 8. The exact width of the major (innermost and intermediate) portions of the narrower slots 6 depends on a plurality of parameters, such as the thickness of the spring 1, as considered in the axial direction of the annular section 2, the nature of the machine wherein the spring 1 is produced and/or others. As a rule, the major portions of the narrower slots 6 will be narrow or very narrow (e.g., their width need not appreciably exceed or can be less than the thickness of the spring 1). The dimensions of the enlarged outermost portions 8 of the narrower slots 6 will also depend on several parameters, such as the thickness of the spring 1, the characteristics of the material of the spring, the anticipated stressing of the spring, other problems involving tensional stresses, as well as the dimensions of the fasteners (see the rivets 9) which extend through the outermost portions 8 when the spring 1 is secured to a support, such as the cover or housing 17 of the friction clutch shown in FIG. 2. It is to be noted here that the improved spring can also be used in devices other than friction clutches.

The wider slots 7 have relatively wide outermost portions 10. The width (indicated at 11) of an outermost portion 10 preferably equals 2m+n wherein m is the width (indicated at 12 in FIG. 1) of an outermost portion 8 and n (indicated at 13 in FIG. 1) is the width of a finger 3 in the region between a pair of adjacent outermost portions 8 and 10. As can be seen in FIG. 1, the distance n is measured along a radius which is located between the radially innermost and radially outermost parts or regions of the enlarged portions 8 and 10.

As indicated in FIG. 1 by phantom lines at 10', the outlines of certain parts (10a and 10b) of each outermost portion 10 match or resemble the outline of an outermost portion 8 therebetween. The spacing of parts 10a and 10b of each outermost portion 10 matches the spacing between the part 10a or 10b and the neighboring outermost portion 8, i.e., the pitch or distribution of outermost portions 8 and parts 10a, 10b of outermost portions 10 is the same, as considered in the circumferential direction of the annular section 2. Otherwise stated, the distance n between a portion 8 and the neighboring portion 10 equals the distance between the parts 10a, 10b of any given outermost portion 10. This means that each wider slot 7 could accommodate an additional finger the outer end portion or lug of which is indicated at 21. The lugs 21 effect partial separation of the parts 10a and 10b of the respective enlarged outermost portions 10. A feature of the present invention provides that the inner end portions or tips 3b of the "remaining" (full-sized) fingers 3 be at least substantially equidistant from each other and have at least substantially identical widths, as considered in the circumferential direction of the opening 5 and/or annular section 2 of the spring 1. In other words, the width of the inner end portion 3b of each finger 3 is the same, and the width of the innermost portion (6a or 7a) of each slot 6 or 7 is also the same. The width of the innermost portions 6a and 7a suffices or approximates that which is required to ensure adequate die clearance.

FIG. 1 shows that each of the fingers 3 is flanked by a wider slot 7 and a narrower slot 6. Otherwise expressed, and as considered in the circumferential direction of the section 2, each pair of neighboring fingers 3 is flanked by two wider slots 7 (or two narrower slots 6) and the fingers of such pair are separated from each other by a narrower slot 6 (or a wider slot 7). Since the narrower slots 6 have relatively narrow enlarged outermost portions 8 and the wider slots 7 have relatively wide enlarged outermost portions 10, the ratio of the width of the annular section 2 to the width of fingers in the transition zone 14 between the fingers 3 and section 2 is much more satisfactory than if an additional (full-sized) finger were provided in lieu of a portion of each wider slot 7. The just discussed design of the spring 1 brings about a smoothing effect upon the undulations which develop when the spring 1 is flexed in use with attendant reduction of tension in the spring. The feature that the inner end portions 3b of the fingers 3 are relatively wide in the region 15 where the fingers are engaged when the spring 1 is in use in a friction clutch or the like (either by an annular pressure generating member or by a disengaging bearing) contributes to an increase of the surface area or contact area in the region 15 with attendant increase of supporting surface which is highly desirable because it entails a reduction of the extent of wear in response to repeated flexing of the spring by the application of deforming stresses in the region of the inner end portions 3b of the fingers 3.

The extent of wear is reduced still further if the innermost portions 7a of the slots 7 (as indicated at 3a in FIG. 1) are of at least substantially constant width, as considered in the circumferential direction of the region 15 of application of stresses to the inner end portions 3b. In other words, the surfaces flanking a slot 7 are not inclined with reference to each other all the way to the inner end faces 4 of the fingers 3 but are parallel in the regions of the inner end portions 3b of the fingers. The width of the innermost portions 6a and 7a of the slots 6 and 7 is at least substantially constant in the region extending from the end faces 4 and toward and radially outwardly beyond the locus (15) of application of deforming stresses upon the inner end portions 3b; from thereon, the surfaces flanking the slots 7 diverge in a direction radially outwardly toward the annular section 2 of the diaphragm spring 1. The just discussed feature is of particular importance in connection with the innermost portions of the slots 7 because the width of the narrower slots 6 is or can be uniform all the way from the end faces 4 to the respective enlarged portions 8. Thus, whereas the major part (intermediate portion) of each relatively wide slot 7 is flanked by two mutually inclined surfaces (7A) of the respective fingers 3 (such surfaces make a relatively small acute angle), the innermost portion 7a of each slot 7 is or can be flanked by two at least substantially parallel inward extensions (3a) of the respective surfaces 7A.

Figure 2:
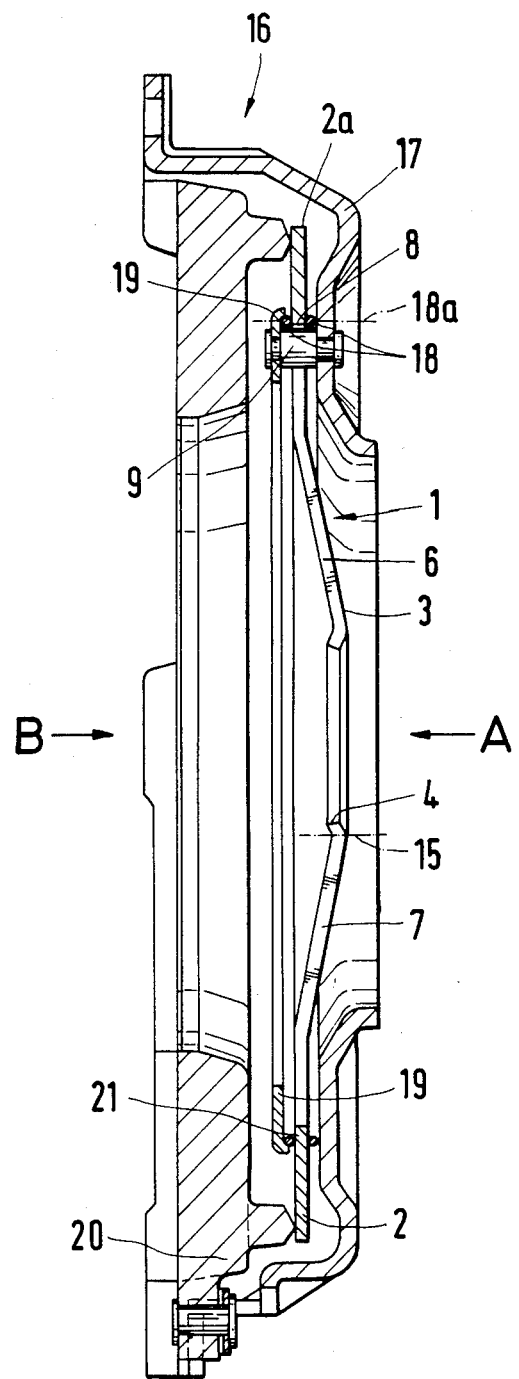
FIG. 2 is a fragmentary substantially axial sectional view of a friction clutch embodying the diaphragm spring of FIG. 1, the section of FIG. 2 being taken in the direction of arrows substantially as seen from the line II—II of FIG. 1.

FIG. 2 shows, by way of example, a device 16 which embodies a diaphragm spring 1 of the type shown in FIG. 1. The device 16 is a friction clutch for use in an automotive vehicle or the like and further comprises the aforementioned cupped support or cover 17 to which the spring 1 is secured in prestressed condition by several fasteners 9. The illustrated fasteners 9 are rivets whose shanks extend through the enlarged outermost portions 8 of the narrower slots 6 in the spring 1. The transition zones 14 of the spring 1 are located radially inwardly of two ring-shaped wire-like seats 18 so that the spring 1 is fulcrumed between the two seats and can move the radially outermost portion 2a of the annular section 2 toward or away from an annular pressure plate 20. The reference character 19 denotes a supporting ring which is held by the inner heads of the rivets 9 and serves as a back support for the left-hand seat 18. The inner end portions 3b of the fingers 3 of the spring 1 are accessible for the application of stresses in the direction of arrow A or B; such stresses are applied at 15. The seats 18 engage the spring 1 (at 18a) radially outwardly of the rivets 9, i.e., radially outwardly of the enlarged outermost portions 8 of the narrower slots 6 or in the regions of the radially outermost parts of outermost portions 8. Note FIG. 1 which indicates the region 18a by an arcuate phantom line located slightly radially outwardly of the enlarged outermost portions 8 and 10 of the slots 6 and 7. The reference character 21 denotes one of the aforementioned lugs which are disposed centrally of the enlarged outermost portions 10 and can be said to constitute the remnants of additional fingers which were removed in order to increase the width of the slots 7. The lugs 21 contribute to an increase of the area of contact between the annular section 2 of the spring 1 and the seats 18 at 18a. This, in turn, contributes to a pronounced reduction of wear upon the spring 1 (between the seats 18) and/or of wear upon the seats 18. The remaining portions of the friction clutch 16 are not shown because they are of conventional design. Reference may be had, for example, to U.S. Pat. No. 2,385,517 granted to Hunt and/or to U.S. Pat. No. 3,283,864 granted to Motsch.

An important advantage of the improved diaphragm spring 1 is that the ratio of the combined area of outer end portions of the fingers 3 to the width of the annular section 2 is within a range which ensures that the extent to which the section 2 undulates (as considered in the circumferential direction of the section 2) when the spring is installed in prestressed condition, and a force (note the arrow A or B) is applied to the inner end portions 3b of the fingers in order to change the conicity of the spring, is reduced to a minimum, i.e., that the stresses in the region where the fingers 3 merge into the section 2 are within an acceptable range with attendant increase of the useful life of the spring. This is due to the fact that the enlarged outermost portions 8 of the narrower slots 6 alternate with the much wider enlarged outermost portions 10 of the wider slots 7.

Another important advantage of the improved spring is that the width of all inner end portions 3b is at least substantially constant and that the combined area of such inner end portions is relatively large (because the width of the innermost portions 7a of the wider slots 7 need not exceed the width of the innermost portions 6a of the narrower slots 6). This reduces the extent of wear upon the inner end portions 3b when the spring 1 is used in a friction clutch or a like device wherein the force A or B is applied to the end portions 3b in order to change the conicity of the spring. It can be said that the inner end portions 3b of the fingers 3 flanking a wide slot 7 are "shifted" toward each other to thereby ensure that the width of the respective innermost portion 7a will not exceed the width of the innermost portions 6a.

The feature that the width of each enlarged outermost portion 10 equals or approximates $2m+n$ renders it possible to dispense with each third finger (as considered in the circumferential direction of the section 2), i.e., to leave only the lug 21 of each third finger but to remove the major portion thereof. The elimination of each third finger contributes to a reduction of the aforediscussed undulations and of stresses which tend to develop in the region of merger of outer end portions of the fingers 3 into the annular section 2. On the other hand, and since the width of all inner end portions 3b is or can be the same and the width of the innermost portions 6a and 7a of the slots 6 and 7 is held to a minimum, the area of contact between the inner end portions 3b of the fingers 3 and a bearing or the like is reduced much less than would have to be anticipated in view of the elimination of each third finger.

The rivets 9 can be replaced by other types of fasteners, such as prongs, which secure the diaphragm spring to and at the same time center the spring relative to its support.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforediscussed contribution to the art and, therefore, such adaptations should and are intended to be comprehended within the meaning and range of equivalence of the appended claims.

I claim:

1. A diaphragm spring, particularly for use in friction clutches, comprising an annular main section; and a plurality of elongated fingers extending from said section substantially radially inwardly and having inner end portions with end faces defining a substantially circular opening, said fingers defining between themselves alternating elongated first and second slots extending from said end faces to said section and respectively having enlarged first and second outermost portions of lesser and greater width, as considered in the circumferential direction of said section, the width of said first slots being at least substantially identical with the width of said second slots in the region of the inner end portions of said fingers.

2. The diaphragm spring of claim 1, wherein said fingers include pairs of neighboring fingers which are separated from each other by a first slot and which are followed by a second slot, as considered in the circumferential direction of said section.

3. The diaphragm spring of claim 1, wherein each of said second slots has an innermost portion of substantially constant width and an intermediate portion tapering at a relatively small acute angle outwardly toward the respective second outermost portion.

4. The diaphragm spring of claim 1, wherein said section has relatively short lugs extending substantially radially inwardly into each of said second outermost portions.

5. The diaphragm spring of claim 1, wherein the inner end portions of said fingers have at least substantially identical widths, as considered in the circumferential direction of said section.

6. A diaphragm spring, particularly for use in friction clutches, comprising an annular main section; and a plurality of fingers extending from said section substantially radially inwardly and including pairs of elongated fingers alternating with discrete short fingers, as considered in the circumferential direction of said section, said elongated fingers having inner end portions with end faces defining a substantially circular opening and said elongated fingers defining between themselves slots and the slot between the fingers of each of said pairs of elongated fingers extending all the way from the end faces of such fingers to said section, the neighboring pairs of elongated fingers defining additional slots extending from said opening to said section and having enlarged outermost portions, all of said slots having innermost portions of identical width, as considered in the circumferential direction of said section, and such innermost portions of identical width being adjacent to the inner end portions of the respective elongated fingers.

7. The diaphragm spring of claim 6, wherein said short fingers constitute relatively short lugs extending radially inwardly of said section and halving the outermost portions of the respective additional slots.

8. The diaphragm spring of claim 6, wherein the inner end portions of said elongated fingers have at least substantially identical widths, as considered in the circumferential direction of said section.

9. In a device of the character indicated, the combination of a diaphragm spring having an annular main section and a plurality of elongated fingers extending from said section substantially radially inwardly and having inner end portions with end faces defining a substantially circular opening, said fingers defining between themselves alternating elongated first and second slots extending from said end faces to said section and respectively having enlarged first and second outermost portions of lesser and greater width, as considered in the circumferential direction of said section, said slots having innermost portions of identical width, as considered in the circumferential direction of said section, and such innermost portions being adjacent to the inner end portions of the respective fingers; a support for said spring; and means for securing said spring to said support, said securing means including a plurality of fasteners having portions extending through the outermost portions of at least some of said first slots.

10. The combination of claim 9, wherein said fasteners include rivets.

11. The combination of claim 9, wherein said device is a friction clutch and said support includes a cover.

12. The combination of claim 9, wherein the inner end portions of said fingers have at least substantially identical widths, as considered in the circumferential direction of said section.

* * * * *